United States Patent
Bandera et al.

(10) Patent No.: US 6,583,261 B2
(45) Date of Patent: Jun. 24, 2003

(54) POLYETHYLENETEREPHTHALATE EXTRUSION EQUIPMENT

(75) Inventors: Franco Bandera, Varese (IT); Enrico Venegoni, Varese (IT)

(73) Assignee: Costruzioni Meccaniche Luigi Bandera S.p.A., Busto Arsizio - Varese (IT)

( * ) Notice: Subject to any disclaimer, the term of this patent is extended or adjusted under 35 U.S.C. 154(b) by 0 days.

(21) Appl. No.: 10/056,954

(22) Filed: Jan. 25, 2002

(65) Prior Publication Data

US 2002/0100995 A1 Aug. 1, 2002

(30) Foreign Application Priority Data

Jan. 29, 2001 (IT) .................................. MI2001A000152

(51) Int. Cl.⁷ .................................................. C08F 6/00
(52) U.S. Cl. .................. 528/480; 264/102; 264/211.23; 264/349; 264/464
(58) Field of Search .......................... 528/480; 264/102, 264/211.23, 349, 464

(56) References Cited

PUBLICATIONS

FTX Twin–Screw Extruder, Farrel "Farrel Homepage" Jan. 2001; pp. 1–3 and 1–5.*

* cited by examiner

*Primary Examiner*—Terressa M. Boykin
(74) *Attorney, Agent, or Firm*—Hedman & Costigan, P.C.

(57) ABSTRACT

Polyethyleneterephthalate extrusion equipment of material in granule form, still humid, coming from both ground recovered products and also virgin material, comprising a chassis (29), containing a co-rotating, oil-thermoregulated extruder with two screws (31, 32), which comprises a first zone (A), equipped with an opening (34) where there is an aspiration hood (35) for a first "open top" degassing, a second zone (C) where there is at least one stack (37, 38) for a further degassing, between the two zones (A, C), there being a tight zone (B), and a carrying and loading zone (E) activated by the screws (31, 32). The description also relates to an extrusion process of polyethyleneterephthalate effected in a co-rotating twin-screw extruder which comprises in a first zone (A) an "open top" degassing phase, followed by a stack (37, 38) degassing phase, between the two phases there being a tight zone which does not deteriorate the material, followed by a carrying, loading and amalgamation phase of the molten material and a final pumping phase with the extrusion of polyethyleneterephthalate.

7 Claims, 3 Drawing Sheets

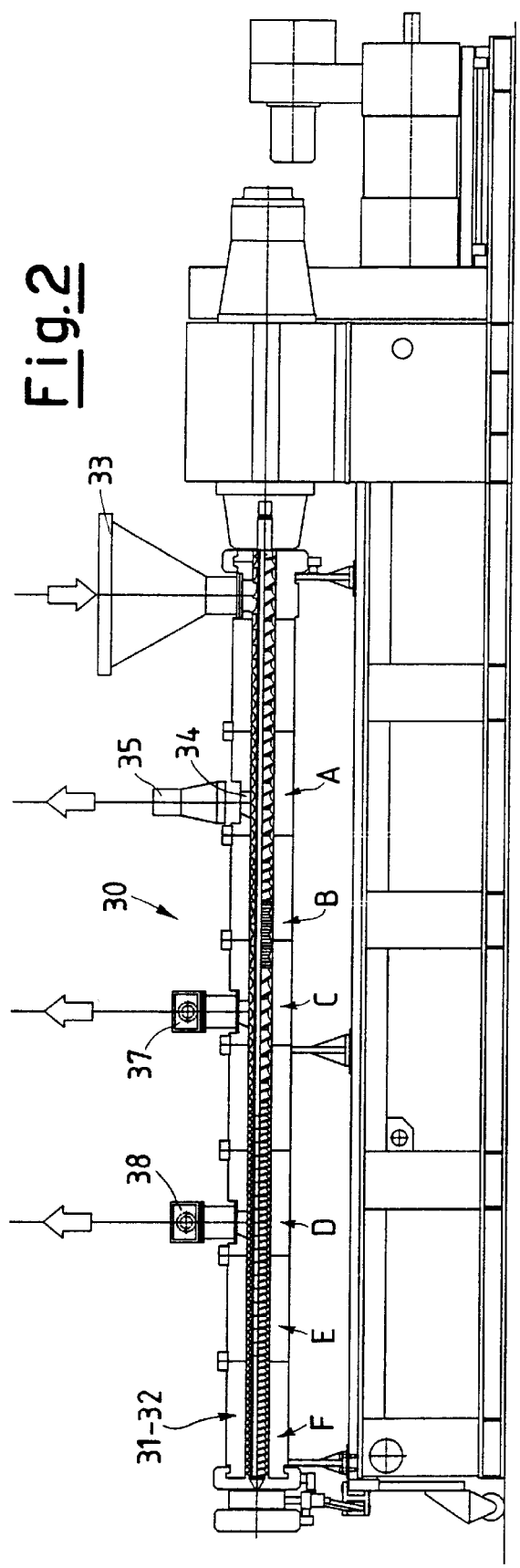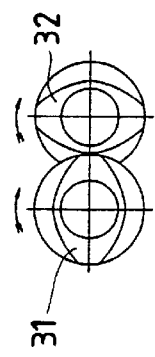

POLYETHYLENETEREPHTHALATE EXTRUSION EQUIPMENT

BACKGROUND TO THE INVENTION

The present invention relates to equipment for the extrusion of polyethyleneterephthalate.

Polyethyleneterephthalate (PET) is an extremely hygroscopic material; it is packaged and sold by manufacturers in the form of granules, with a degree of humidity equal to about 2,000 parts per million.

Before being able to be extruded, it is first dehumidified at 160° C. for 6 hours, in order to eliminate the humidity internally and externally incorporated in each granule, up to 20 parts per million. Under these conditions, the material cannot be extruded without its hydrolyzing and so that it maintains a characteristic intrinsic viscosity.

Traditional dehumidification processes take place in most cases before the extrusion phase with single screws and prove to be complex and costly.

This traditional dehumidification process consists in keeping a quantity of material equal to the productive rate of the extruder (kg/hr), for 6 hours in a silo, and passing humidity-free air through it, with a considerable energy consumption.

Furthermore, it should be considered that, when PET comes from the recovery of ground post-consumption bottles and/or ground thin sheets deriving from waste products from the thermoforming of trays and blisters, dehumidification becomes particularly complex.

This material, in fact, over a temperature of 80° C., tends to soften and, if it is not in granule form, as in this case, it conglomerates and can no longer be handled, unless its apparent weight is increased by means of an additional densification process.

The objective of the present invention is to produce equipment which overcomes the technical problems described above.

A further objective is to produce equipment which is particularly simple and with limited costs, which allows an optimum extrusion to be achieved.

An additional objective is obviously to be able to produce polyethyleneterephthalate (PET) without having to dehumidify and densify the ground product.

SUMMARY OF THE INVENTION

These objectives according to the present invention are achieved by producing equipment for the extrusion of Polyethyleneterephthalate which comprises a chassis (29), containing a co-rotating, oil-thermoregulated extruder with two screws (31, 32), which comprise a first zone (A), equipped with an opening (34) where there is an aspiration hood (35) for a first "open top" degassing, a second zone (C) where there is at least one stack (37, 35) for a further degassing, between the two zones (A,C) there being a tight zone (B), and a carrying and loading zone (E) activated by the screws (31,32).

The characteristics and advantages of a set of equipment for the extrusion of polyethyleneterephthalate according to the present invention can be more clearly understood from the following illustrative and non-limiting description.

BRIEF DESCRIPTION OF THE DRAWINGS

FIG. 2 shows an elevation view of a co-rotating twin-screw extruder according to the present invention, schematic and partially sectioned, FIG. 3 is a schematic cross-section of the two screws of the twin-screw extruder.

DETAILED DESCRIPTION OF THE INVENTION

Figure 1:
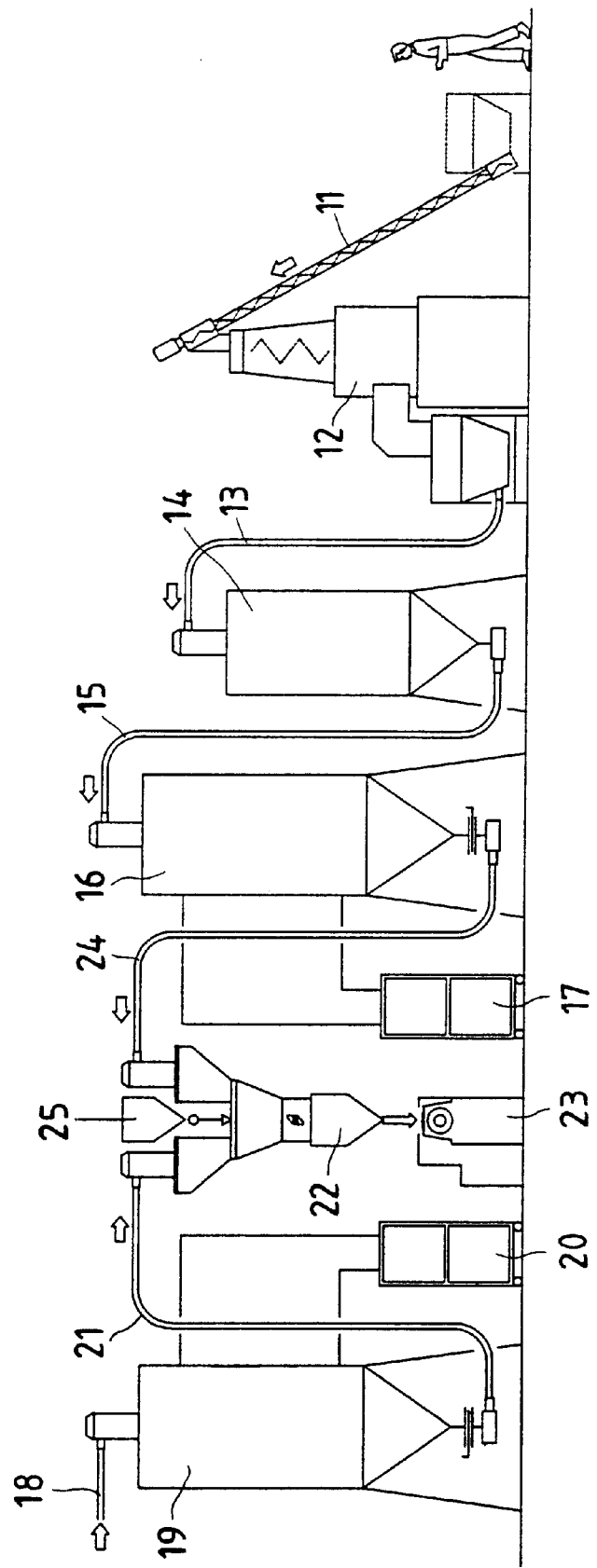
FIG. 1 is an elevation side-view of a schematic plant illustrating a process according to the known art.
Figure 5:
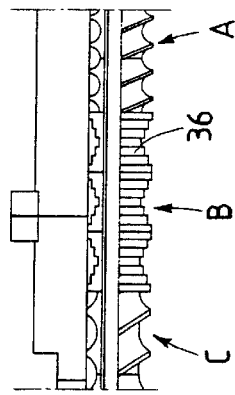
FIGS. 5, 6 and 7 are enlarged views of details of a section of the extruder illustrated in FIG. 4.
Figure 6:
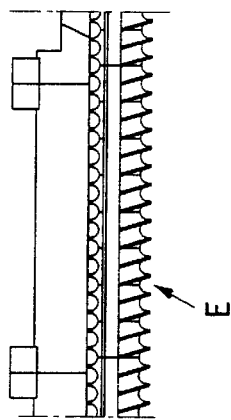
Figure 7:
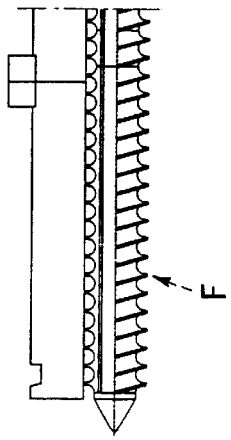
Figure 4:
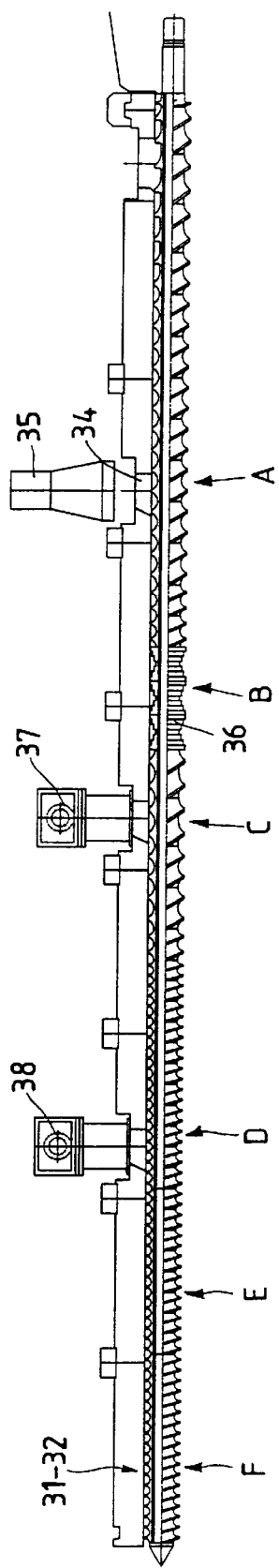
FIG. 4 is an enlarged section of an upper part of the extruder.

With reference to FIG. 1, this illustrates a schematic plant showing a process according to the known art, previously described.

The figure shows how polyethyleneterephthalate (PET), ground into granules and coming from the recovery of bottles, thermoforming waste sheets, etc., is fed by means of a conveyor 11 towards a densifying group indicated with 12 from which it is sent in turn by means of a duct 13 towards a silo container 14.

The material is subsequently sent, by means of a further duct 15, to a hopper 16 in which it is kept for about 6 hours at a temperature of 160° C. The hopper is coupled with a dehumidifying group 17 which allows this temperature to be maintained inside the hopper 16.

Parallelly, polyethyleneterephthalate (PET) as virgin material in granule form, is fed by means of a piping 18, to a hopper 19 in which it is kept for about 6 hours at a temperature of 160° C. The hopper 19 is also coupled with a dehumidifying group 20 which allows this temperature to be maintained inside the hopper 19. A piping 21 leaving the hopper 19 is connected to an additional hopper 22 for feeding a co-rotating twin-screw extruder 23 of the known type.

A second piping 24 is connected to the hopper 16 and receives the densified and dehumidified ground recovered material to be charged into the extruder 23, together with the master fed from a further hopper 25.

It can therefore be noted that particularly complex dehumidification phases must be effected, which create the problems of the known art described above.

FIGS. 2–7 illustrate a co-rotating twin-screw extruder, indicated as a whole with 30, which forms the equipment object of the present invention.

Two screws 31 and 32, co-rotating in the same rotational direction, are situated in this extruder 30, inside a chassis 29. The polyethyleneterephthalate material in the form of granules, still humid, coming from both recovery products and virgin material, is fed by means of a feeding inlet 33. This material, according to the invention, is treated between the two screws 31 and 32 so as to advance inside the extruder which is, for example, oil thermoregulated.

After a certain length inside the body of the extruder 30, there is an opening 34 in a first zone A, in correspondence with which there is an aspiration hood 35 which effects a degassing called "open top" degassing. This aspiration hood 35 is under slight vacuum to prevent the material (granule/sheet), which in this position of the above extruder is not yet molten, but only sintered, from being damaged. The material, in fact, only partially fills the air gaps of the screws 31, 32 and any possible strong vacuum could remove a part of it.

Proceeding inside the extruder 30, in a subsequent second zone B, there is a series of parts which acts as a seal. This zone B consists in the presence of a series of cams 36, situated on the screws 31, 32, which are loaded with almost molten material and under slight pressure. This expedient prevents the strong vacuum of the subsequent degassing group described hereafter, from influencing the previous "open top" degassing.

A first stack 37 is, in fact, situated in a zone C, followed at a short distance by a second stack 38, in a further zone D, both for additional degassing. These two stacks effect a tandem degassing which, for example, in an extruder with a length ratio of 34 to 42 diameters, can be at a distance between the two stacks of about 6/9 diameters.

Internally, the screw is constructed so as to be only partially filled with molten material and to expose the material being treated to crushing and calendering action for a long time. In this way, the whole of the mass is subjected to the aspirating action of the vacuum effect thus created.

This degassing has the specific function of removing the evaporated water contained in the material.

The extruder 30 then continues with a further zone E in which carrying and loading are effected, activated by the screws 31 and 32.

Finally, a final zone F of the extruder 30 activates the final pumping of the material produced with said process.

This series of phases carried out in the extruder of the present invention thus allows a humid granular material to be treated, avoiding complicated dehumidification operations.

The new and original nature of the process on which the invention is based is evident.

In said process, in fact, polyethyleneterephthalate material (PET) in granules, coming from both virgin material and also from the grinding of recovered products, is fed into a co-rotating twin-screw extruder in its present condition, i.e. containing humidity.

Once a mixture of the two types of material specified above, has been charged, there is an "open top" degassing phase in a first zone, followed by a further degassing phase by means of at least one stack. Between the two phases, a tight zone is necessary, inside the apparatus, for not influencing the two phases and deteriorating the material under production.

In particular, this additional degassing phase is effected by means of two tandem stacks to optimize the operation.

A carrying and loading phase is subsequently effected, which facilitates the amalgamation of the molten material, followed by a final pumping phase, obtaining the extrusion of polyethyleneterephthalate (PET) deriving from granules of both virgin material and also material coming from the grinding of recovered products.

The problems of the known art described above are thus solved by eliminating the dehumidification phases and the equipment associated therewith, with a considerable saving of resources and operating time.

The equipment and extrusion process of polyethyleneterephthalate thus conceived can undergo numerous modifications and variations, all included in the scope of the invention; all details can, moreover, be substituted by technically equivalent elements. In practice, the devices used, as also the dimensions, can vary according to technical requirements.

What is claimed is:

1. Polyethyleneterephthalate extrusion equipment of material in granule form, still humid, coming from both ground recovered products and also virgin material, comprising a chassis (29), containing a co-rotating, oil-thermoregulated extruder with two screws (31, 32), which comprises a first zone (A), equipped with an opening (34) where there is an aspiration hood (35) for a first "open top" degassing, a second zone (C) where there is at least one stack (37, 38) for a further degassing, between the two zones (A, C) there being a tight zone (B), and a carrying and loading zone (E) activated by the screws (31, 32).

2. The extrusion equipment according to claim 1, characterized in that it comprises a further final zone (F) which activates the final pumping of the material produced with said equipment.

3. The extrusion equipment according to claim 1, characterized in that said tight zone (B) between said zone (A) and said zone (C) is produced by a series of cams (36) situated on said screws (31, 32) which are loaded with almost molten material and under slight pressure.

4. The extrusion equipment according to claim 1, characterized in that said second zone (C) which comprises said at least one stack (37) is extended, after a short distance, to a further zone (D) equipped with a second stack (38).

5. The extrusion equipment according to any of the previous claims, characterized in that said extruder has a length ratio of 34 to 42 diameters.

6. The extrusion equipment according to claim 5, characterized in that in said extruder two stacks (37, 38) which effect a tandem degassing, are at a distance of about % diameters.

7. A polyethyleneterephthalate extrusion process of a material in granule form, still humid, coming from both ground recovered products and virgin material, effected in a co-rotating twin-screw extruder which comprises an "open top" degassing phase in a first zone (A), followed by a further degassing by means of at least one stack (37, 38), between said two phases, there being a tight zone to prevent the deterioration of the material under production, said process subsequently comprising a carrying and loading phase which facilitates the amalgamation of the molten material, followed by a final pumping phase where the extrusion of polyethyleneterephthalate (PET) is obtained.

* * * * *